(12) United States Patent
Santoro

(10) Patent No.: US 10,947,945 B2
(45) Date of Patent: Mar. 16, 2021

(54) METHODS AND SYSTEMS FOR CONTROL OF ELECTRIC COMPONENTS

(71) Applicant: University of Alaska Fairbanks, Fairbanks, AK (US)

(72) Inventor: Lee J. Santoro, Fairbanks, AK (US)

(73) Assignee: Lee J. Santoro, Fairbanks, AK (US)

( * ) Notice: Subject to any disclaimer, the term of this patent is extended or adjusted under 35 U.S.C. 154(b) by 0 days.

(21) Appl. No.: 16/167,127

(22) Filed: Oct. 22, 2018

(65) Prior Publication Data

US 2019/0120196 A1 Apr. 25, 2019

Related U.S. Application Data

(60) Provisional application No. 62/575,230, filed on Oct. 20, 2017.

(51) Int. Cl.

| | | |
|---|---|---|
| G01R 31/36 | (2020.01) | |
| F02N 19/02 | (2010.01) | |
| F02D 41/06 | (2006.01) | |
| B60L 58/27 | (2019.01) | |
| B60W 10/06 | (2006.01) | |
| F02N 11/08 | (2006.01) | |
| B60L 1/04 | (2006.01) | |
| F02N 11/12 | (2006.01) | |

(52) U.S. Cl.
CPC ............ *F02N 19/02* (2013.01); *B60L 1/04* (2013.01); *B60L 58/27* (2019.02); *B60W 10/06* (2013.01); *F02D 41/064* (2013.01); *F02N 11/0807* (2013.01); *B60L 2240/36* (2013.01); *B60L 2240/662* (2013.01); *B60L 2240/70* (2013.01); *B60W 2510/0676* (2013.01); *F02D 2200/021* (2013.01); *F02N 11/0811* (2013.01); *F02N 11/12* (2013.01); *F02N 2300/306* (2013.01)

(58) Field of Classification Search
CPC .. F02N 19/02; F02N 11/0807; F02N 11/0811; F02N 11/12; F02N 2300/306; B60L 1/04; B60L 58/27; B60L 2240/36; B60L 2240/662; B60L 2240/70; F02D 41/064; F02D 2200/021; B60W 2510/0676; B60W 10/06; Y02T 10/70; Y02T 90/16; Y02T 10/72

See application file for complete search history.

(56) References Cited

U.S. PATENT DOCUMENTS

| | | | | |
|---|---|---|---|---|
| 9,365,188 | B1 * | 6/2016 | Penilla | G06Q 20/18 |
| 9,539,877 | B2 * | 1/2017 | Cheng | B60H 1/00278 |
| 2015/0266392 | A1 * | 9/2015 | Arai | B60L 1/003 320/150 |
| 2016/0101805 | A1 * | 4/2016 | Nishio | H05B 3/34 219/204 |
| 2017/0045903 | A1 * | 2/2017 | Hashimoto | H02J 13/0079 |
| 2017/0113511 | A1 * | 4/2017 | Khafagy | B60H 1/2218 |
| 2017/0217328 | A1 * | 8/2017 | Patel | B60L 50/15 |

(Continued)

*Primary Examiner* — Masud Ahmed
(74) *Attorney, Agent, or Firm* — Ballard Spahr LLP

(57) ABSTRACT

Methods and systems are disclosed for remotely and/or automatically controlling electronic components. The electronic components may be elements/systems of a vehicle (e.g., heating elements). In an aspect, a controller may receive a temperature value from a sensor. The controller may activate a heater based on the temperature value of the sensor. In an aspect, the heater is coupled to one or more parts of an engine.

20 Claims, 10 Drawing Sheets

(56) References Cited

U.S. PATENT DOCUMENTS

2018/0238289 A1* 8/2018 Khonizi ................. G07C 5/008
2018/0307244 A1* 10/2018 Dierker ................. H02J 7/0063
2019/0265884 A1* 8/2019 Penilla .................... B60L 58/12

* cited by examiner

METHODS AND SYSTEMS FOR CONTROL OF ELECTRIC COMPONENTS

CROSS REFERENCE TO RELATED PATENT APPLICATION

This application claims priority to U.S. Provisional Application No. 62/575,230 filed on Oct. 20, 2017, which is herein incorporated by reference in its entirety.

BACKGROUND

Internal combustion engines can be difficult to start in cold weather and can be impossible to start without external heat at a certain temperature. To provide for low temperature starting, heating elements can be installed to warm the engine and other vehicle components. A typical heater provides power to all heating elements that are coupled to the heater when the heater is activated. However, depending on the ambient temperature and engine block temperature, all the heating elements may not be needed.

The cost of providing electric heat during freezing conditions can mount up quickly if not judicially utilized. Thus, clock timers have been utilized in combination with electric heaters to save money on electric usage by activating the heater after a period of time. However, clock timers can only activate or deactivate all the heating elements of the heater, which can be a waste of energy if the ambient temperature does not require all heating elements to be activated.

SUMMARY

It is to be understood that both the following general description and the following detailed description are exemplary and explanatory only and are not restrictive, as claimed. Provided are methods and systems for remote activation/de-activation of one or more heating elements of a vehicle. In an aspect, a controller can receive an indication of an ambient temperature from a temperature sensor. The controller can determine a heating element of a plurality of heating elements to activate based on the ambient temperature. The heating element can be associated with a component of the vehicle. The controller can activate the heating element. The controller can receive an indication of a temperature associated with the component of the vehicle. The controller can deactivate the first heating element based on the temperature associated with the component.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
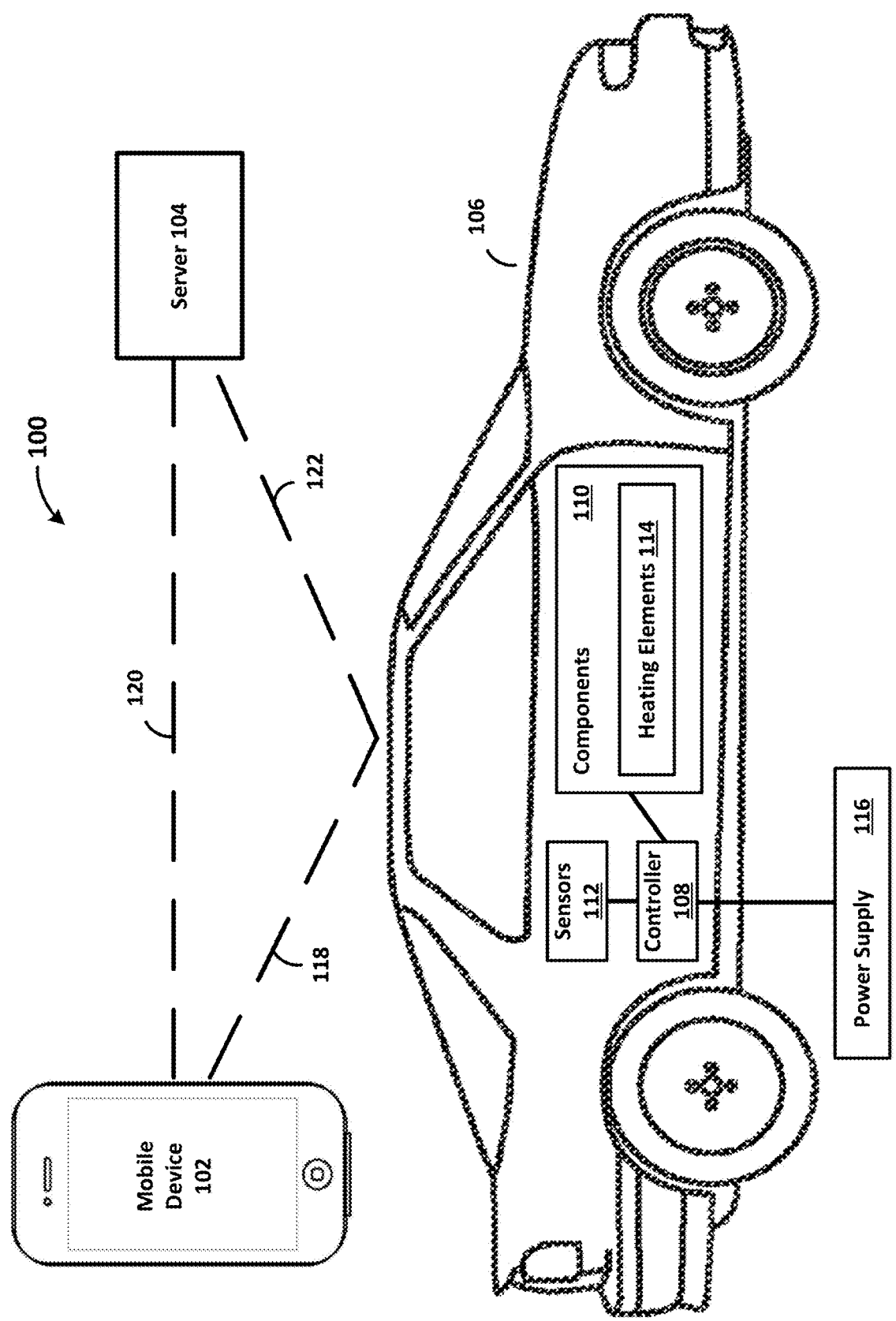
FIG. 1 is a block diagram illustrating an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates a system 100 for remotely and/or automatically controlling elements/systems of a vehicle (e.g., heating elements). In an aspect, the system 100 remotely controls heating elements 114 within the vehicle 106. The system 100 can comprise one or more of a computing device 102, a server 104, and a vehicle 106. The system can further comprise a controller 108 in communication with one or more sensors 112 and/or one or more components 110. One or more of the controller 108, the sensors 112, and/or the components 110 can be housed within a vehicle 106. In an aspect, the controller 108 can be located externally to the vehicle 106. The computing device 102 and the server 104 may be any type of electronic device. For example, the computing device 102 and the server 104 can be a computer, a smartphone, a laptop, a tablet, a wireless access point, a server, or any other electronic device. The computing device 102 and the server 104 may each include an interface for communicating wirelessly using, for example, Wi-Fi, Bluetooth, cellular service, etc. The computing device 102 and the server 104 may also include a plurality of sensors for determining information from the environment such as temperature, air quality, and so forth.

The vehicle 106 may be any suitable vehicle for transportation. For example, the vehicle 106 may be an automobile, a truck, a bus, a train, a tractor, a motorcycle, a boat, an aircraft, etc. The vehicle 106 may have any suitable engine such as a combusting engine (e.g., gasoline, diesel, etc.), a non-combusting engine, an alternative fuel engine (e.g., hybrid, electric, solar powered, etc.), and so forth. The vehicle 106 may include an interface for communicating wirelessly using, for example, Wi-Fi, Bluetooth, cellular service, etc.

As shown, the vehicle 106 can comprise the controller 108 communicatively coupled with the components 110 and the sensors 112. The controller 108 can be coupled to the components 110 directly via one or more cables (e.g., power cables, data cable, etc.). In an aspect, the controller 108 activates and/or deactivates on or more of the components 110. The controller 108 can include a processor, a memory, and an interface for communicating wirelessly using, for example, Wi-Fi, Bluetooth, cellular service and so forth will be explained in more detail with regards to FIG. 7. In an aspect, the controller 108 is an Internet of Things (IoT) device. The controller 108 can be a part of a heater (not shown) that controls heating elements 114. The controller 108 may control the components 110 based on data provided by the sensors 112. For example, the controller 108 may receive data from one of the sensors 112 and may use the data to determine how to operate one of the components 110 and/or heating elements. The controller 108 may selectively activate one or more of the heating elements 114 dynamically based on an ambient air temperature. The ambient air temperature can be measured by one or more of the sensors 112.

The controller 108 can activate the components 110 and/or the heating elements 114 based on data provided by the sensors 112. For example, the controller 108 can receive data from a temperature sensor indicating the ambient temperature is 20 degrees Fahrenheit and may automatically activate one of the heating elements 114. As another example, the controller 108 can receive input directly from a user device that instructs the controller 108 to activate one or more of the heating elements 114. In an aspect, the controller 108 receives an instruction from a third party device to activate one or more the heating elements 114. For example, a government entity (e.g., a city, a county, a state, a governmental agency, etc.) may broadcast a community wide alert that indicates that the one or more heating elements 114 need to be activated.

The controller 108 can automatically activate the components 110 and/or the heating elements 114. The controller 108 can utilize Artificial Intelligence (AI) to determine when to activate the components 110 and/or the heating elements 114. In an aspect, the controller 108 can receive data from the sensors 112 that indicate an ambient temperature and a temperature associated with a component 110. The controller 108 can receive the data over a period of time and determine the optimal temperature to activate and/or deactivate the components 110 and/or the heating elements 114. For example, the controller 110 can determine the optimal ambient temperature to activate one of the components 110 based on the data collected over the period of time. The controller 110 can also determine the optimal component temperature to deactivate one of the components 110 based on the data collected over the period of time. Thus, the controller 110 can learn the optimal conditions to activate and/or deactivate the components 110 in order to minimize energy usage. That is, the controller 108 can utilize temperature sensors 112 (e.g., an ambient air temperature, a component temperature, etc.) to automatically detect when power is needed, or not needed, and automatically regulate power to one or more of the heating elements 114 on an as-needed basis. While a single controller 108 is illustrated for ease of explanation, a person skilled in the art would appreciate that any number of controllers may be present in the vehicle 106. Further, while the components 110 and sensors 112 are illustrated as separate for ease of explanation, a person skilled in the art would appreciate that the components 110 may include the sensors 112.

The components 110 of the vehicle 106 may include any electrical or mechanical component of the vehicle 106. For example, the components 110 can include parts associated with the mechanical function of the vehicle 106 such as an engine, steering components, transmission components, suspension components, as well as parts associated with the electrical function of the vehicle 106 such as actuators, additional controllers, and wiring. The components 110 can also include heating elements 114 associated with at least one of the components 110 of the vehicle 106. For example, the heating elements 114 can include heaters for parts of the engine (e.g., a headbolt heater, an oil pan heater, etc.), heaters for electrical components (e.g., a battery blanket), heaters for mechanical components (e.g., a transmission heater), and heaters for other components 110 of the vehicle 106. The heating elements 114 may be any type of device for providing heat such as an electrical heater, a gas heater, and so forth. As will be appreciated by one skilled in the art, the vehicle 106 comprises a significant number of components 110 and the present disclosure should not be limited to the aforementioned examples.

The sensors 112 of the vehicle 106 may measure any parameter associated with the vehicle 106 and the components 110. The sensors 112 may include an optical sensor, chemical sensor, a capacitance sensor or other electromagnetic sensor, an accelerometer, as well as an air quality sensor that detects the air quality of the air around the vehicle 106, as well as any exhaust fumes produced by the vehicle 106. The sensors 112 can also include temperature sensors that measure an ambient temperature (e.g., an external ambient temperature), an internal vehicle temperature (e.g., a temperature of a passenger cabin), and a temperature associated with one or more components 110. For example, one of the sensors 112 can be a temperature sensor that provides data indicating an ambient temperature associated with the vehicle 106 to the controller 108. The controller 108 can determine whether the ambient temperature meets (e.g., satisfies, exceeds, etc.) a certain threshold. The threshold can be based on a style of the vehicle 106, a make of the vehicle 106, the model of the vehicle 106, or a year of manufacture of the vehicle 106. The controller 108 can transmit a control signal to the heating elements 114 to activate and/or deactivate based on the ambient temperature. As another example, the sensor 112 can provide the temperature for a specific component 110 to the controller 108. The controller 108 can determine that the heating element 114 of the specific component 110 should be activated in order to increase the temperature of the specific component 110. In this manner, the controller 108 is capable of controlling the heating elements 114.

The controller 108 can be coupled to a power supply 116. The power supply 116 can provide power to the controller 108, the sensors 112, the components 110, and/or the heating elements 114. The power supply 116 can be a generator, an electrical connection (e.g., a residential and/or a commercial electrical connection), or a battery. In an aspect, the controller 108 receives power from the power supply 116 and provides power to the heating elements 114. For example, the controller 108 can selectively provide power to one or more of the heating elements 114 to activate the one or more heating elements 114. The controller 108 can stop providing power to one or more of the heating elements 114 to deactivate the one or more heating elements. Thus, the controller 108 can selectively provide power to the heating elements 114 to activate and/or deactivate the heating elements 114 to minimize power consumption.

As illustrated in FIG. 1, the computing device 102 and the controller 108 can be communicatively coupled via a communications link 118. As an example, the computing device 102 and the controller 108 may communicate via a wireless network (e.g., Wi-Fi, Bluetooth). The computing device 102 and the controller 108 may exchange data using the communications link 118. As an example, the controller 108 may provide data from the sensors 112 to the computing device 102. The controller 108 may also provide the current status of components 110 and heating elements 114 within the vehicle 106 to the computing device 102. For example, the controller 108 may provide data indicating that a heating element 114 of one of the components 110 is not activated. As shown, the vehicle 106 includes the controller 108. Thus, any reference to the capability of the vehicle 106 in the present disclosure should be understood to include the capability of the controller 108, and vice versa.

In an aspect, the computing device 102 may provide a control signal to the controller 108 in order to control operation of one of the components 110 within the vehicle 106. The control signal may include settings for the components 110, data related to settings of the components 110, instructions for the components 110, and any information related to the control of the components 110. As an example, the computing device 102 may transmit a control signal to the controller 108 to activate one or more of the heating elements 114 in order to increase the temperature of one or more of the components 110.

In an aspect, the computing device 102 may also transmit settings and/or instructions to the controller 108 to modify operation of the controller 108. For example, the settings and/or instructions can indicate when the controller 108 activates and deactivates the heating elements 114. As an, the computing device 102 can transmit temperature settings to the controller 108 that indicate at what temperature the controller 108 should activate one or more of the heating elements 114 in order to increase the temperature of one or more of the components 110. The computing device 102 can indicate a start temperature and a stop temperature that the controller 108 should activate the heating elements 114. For example, the computing device 102 can indicate an ambient temperature that the controller 108 should activate a heating element 114, and the computing device 102 can indicate a temperature of a component (e.g., that is associated with the heating element 114) that the controller 108 should deactivate the heating element.

In an aspect, the computing device 102 can indicate a start time and a stop time to activate one or more of the heating elements 114. The computing device 102 can indicate times that the controller 108 should start dynamically managing the heating elements 114. For example, a user of the computing device 102 can select instructions and/or settings for the controller 108 via the computing device 102. The computing device 102 can then transmit the selected instructions and/or settings to the controller 108.

In an aspect, the computing device 102 dynamically decides the instructions or settings that are transmitted to the controller 108 without input from a user. For example, the computing device 102 receives input from a user indicating the preferences and/or settings the user would like the computing device 102 to implement. The computing device 102 can then automatically transmit instructions based on the user indicated preferences and/or settings. The computing device 102 can use Artificial Intelligence (AI) to determine the optimal conditions to activate and/or deactivate one or more of the heating elements 114. In an aspect, the user of the computing device 102 selects specific components 110 and/or heating elements 114 to activate and/or deactivate.

In an aspect, the computing device 102 is a smartphone that has an application which controls the operation of the vehicle 106, the controller 108, the components 110, and/or the heating elements 114. In this manner, the computing device 102 is capable of controlling the components 110 and the heating elements 114 of the vehicle 106.

The computing device 102 can also be communicatively coupled with the server 104 via the communications link 120. As an example, the computing device 102 and the server 104 may communicate via a local wireless network (e.g., Wi-Fi, Bluetooth), a cellular network, a satellite network, or any wireless and/or wired network. The server 104 in turn is communicatively coupled with the controller 108 via the communications link 120. The server 104 and the controller 108 may communicate via a local wireless network (e.g., Wi-Fi, Bluetooth), a cellular network, a satellite network, or any wireless network. The computing device 102 may transmit instructions or settings to the controller 108 via the server 104. For example, the computing device 102 can transmit instructions and/or settings via the communications link 120 to the server 104. The server 104 in turn can transmit the instructions and/or settings to the controller 108 via the communications link 122. The controller 108 of the vehicle 106 receives the instructions and/or settings and controls the components 110 and the heating elements 114 based on the received instructions and/or settings.

In one example, a user of the server 104 selects the instructions and/or settings that are transmitted to the controller 108. In another example, the server 104 dynamically decides the instructions and/or settings that are transmitted without input from a user. In another example, the server 104 receives input from a user indicating the preferences and/or settings the user would like the server 104 to implement. For example, a user may access the server 104 via an internet connection to the server 104 and provide the user's preferences and/or settings via a web browser or similar interface. The server 104 may then automatically transmit instructions based on the user indicated preferences and/or settings. In one example, the user of the server 104 selects specific components 110 or heating elements 114 to activate. In one example, the server 104 is a web based or telecommunications based server that has an associated interface that a user can access which controls the operation of the vehicle 106, the controller 108, the components 110, and/or the heating elements 114.

The computing device 102, the server 104, and the controller 108 may also communicate with services external to the system 100 to determine various environmental parameters such as environmental temperature, air quality, and so forth. For example, the computing device 102, the server 104, and the controller 108 can communicate with a service that provides the environmental temperature for a location (e.g., a town, GPS coordinates, a zip code, etc.) of the vehicle 106. The computing device 102, the server 104, and the controller 108 can use the temperature provided by the service to determine control settings for the heating elements 114. The service may provide the air quality of the air surrounding the location of the vehicle 106 to the computing device 102, the server 104, and the controller 108. The computing device 102, the server 104, and the controller 108 can use the air quality to control function of the components 110. As another example, the service can provide instructions to a community. For example, a government entity (e.g., a city, a county, a state, a governmental agency, etc.) may broadcast a community wide alert that indicates that the one or more heating elements 114 need to be activated. As an example, the alert may be a temperature inversion alert override that could be triggered by the receipt of a community-wide signal. The alert may instruct the controller 108 to override all other input and supply full power to all components when ambient temperature reaches a prescribed level. The temperature inversion alert may be triggered at a certain temperature (e.g., +20° F.). The alert may be received on an FM broadcast station subcarrier, emergency alert system (EAS), and/or conveyed using a wireless communication link (e.g., communication links 118, 120, 122).

As will be appreciate by one skilled in the art, the communications links shown in FIG. 1 can be, but need not be, concurrent. For example, the communications links for each of the individual communications links 118, 120, and 122 can be established at a first time and then later terminated. Further, a person skilled in the art that any number of mobile devices 102, servers 104, and controllers 108 may be implemented in the system 100.

The controller 108 may have an operation switch (not shown) located inside the vehicle 106. The operation switch can control the operation of the controller 108. For example, the operation switch may allow the user to indicate that the controller 108 should provide no power, should provide maximum power, should intelligently provide power, and/or a remote setting that indicates the controller 300 should follow instructions sent from a computing device (e.g., the computing device 102 and/or the server 104 of FIG. 1). As an example, the operation switch can have three different positions associated with three different operational settings. One operational setting may be an "OFF" setting where the controller 108 is bypassed altogether such that the heating elements 114 are controller manually by a user of the vehicle 106. A second operational setting may be that the controller 108 instructions and/or provides power to all of the heating elements 114 without minimizing power consumption. A third operation setting may instruct the controller 108 to use temperature and/or wattage curves.

Figure 2:
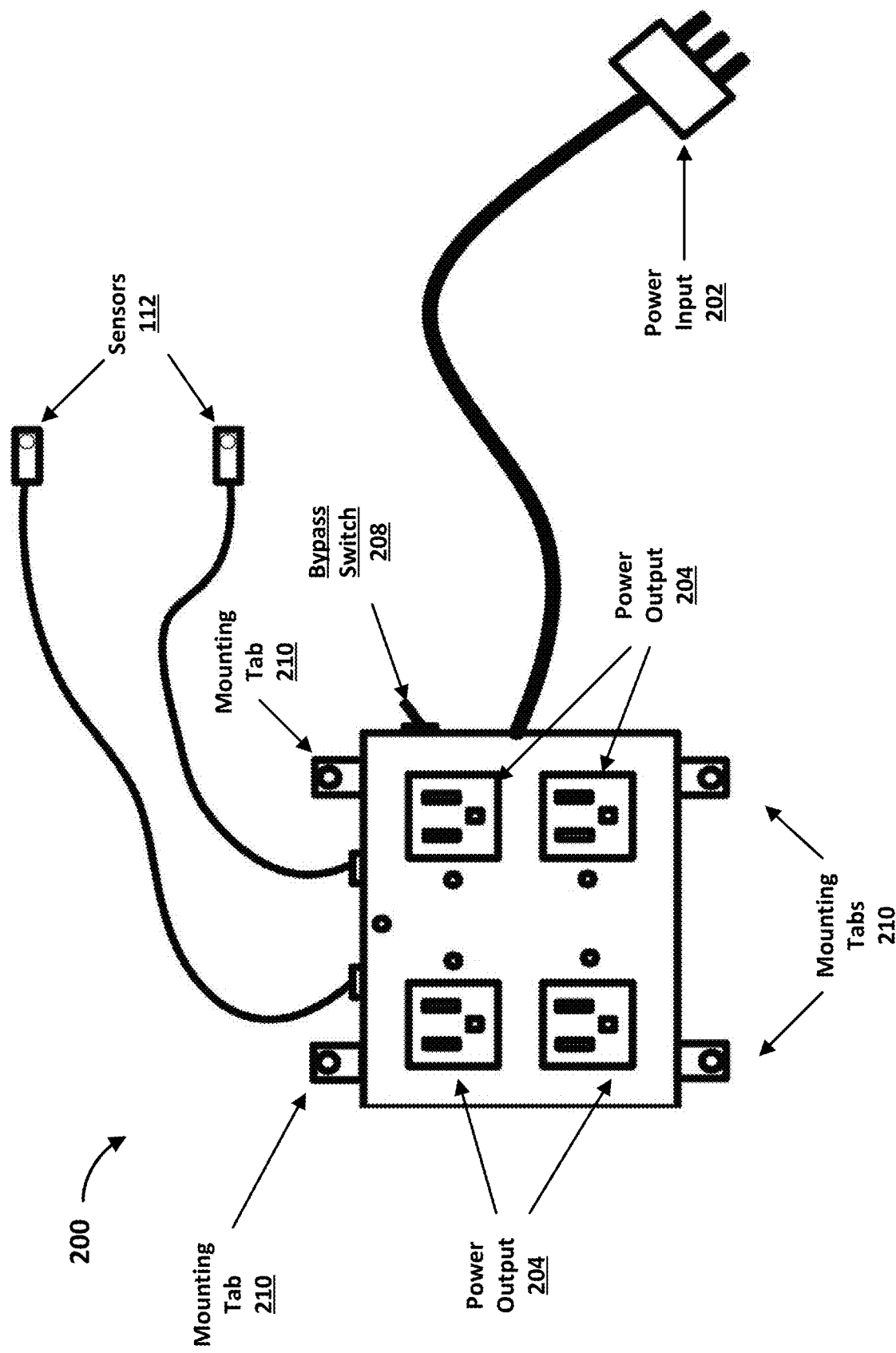
FIG. 2 is a block diagram illustrating an exemplary device.

FIG. 2 illustrates an exemplary controller 200 (e.g., the controller 108 of FIG. 1). As shown the controller 200 has a power input 202 that provides power to the controller 200. The controller 200 may include a micro-controller (not shown) for controlling the amount of energy provided by the controller 200. In an aspect, the controller 200 includes the capabilities of the controller 108. As shown, the controller 200 has two sensors 112. While two sensors are shown for ease of explanation, a person skilled in the art would appreciate that the controller 200 may include any number of sensors 112. In an aspect, the two sensors 112 are temperature sensors. For example, one of the sensors 112 may be located outside of the vehicle 106 to determine the ambient temperature, and the other sensor 112 may be coupled to one of the components 110 of the vehicle 106. Each of the components 110 may have an associated sensor 112 that monitors the temperature of the component.

The power input 202 may provide any amount of power to the controller 200 (e.g., 120 V, 240 V, etc.). The controller 200 has four power outputs 204 that provide power to one or more heating elements (e.g., the heating elements 114 of FIG. 1). The controller 102 can individually activate and/or deactivate each of the power outputs 204. While four power outputs 204 are shown for ease of explanation, a person skilled in the art would appreciate that the controller 200 may include any number of power outputs. The power outputs 204 may provide any amount of power to the heating elements 114 (e.g., 120 V, 240 V, etc.). The controller 200 can dynamically adjust the power provided via the power outputs 204 based on a measured temperature. For example, the controller 200 can provide power via the power outputs 204 to activate one or more heating elements based on the ambient temperature reaching threshold. The controller 200 can modify the amount of power (e.g., 0%, 25%, 50%, 100%, etc.) provided via the power outputs 204. For example, the controller 200 can modify the amount of power provided to a heating element based on a temperature of a component associated with the heating element satisfying a threshold. As an example, as the component temperature increase, the controller 200 may reduce the amount of power provided to the heating element 114 to minimize energy usage. In an aspect, the controller 200 dynamically reduces and/or increase the amount of power provided to the heating element 114 based on one or more of the ambient temperature and/or the component temperature.

The controller 200 can utilize Artificial Intelligence (AI) to customize operation of the controller 200 over time. For example, the controller 200 can modify operation of the controller 200 based on preferences of a user, a user's use of the vehicle, the times a user uses the vehicle, driving habits of the user, and so forth. The controller 200 can have a decision matrix that factors in various parameters such as a vehicles engine, size of engine heater, and/or the owner/operator schedule. The controller 200 can activate and/or deactivate heating elements based on the customized operation determined by the controller 200.

The controller 200 includes a bypass switch 208. In one example, the bypass switch 208 allows a user of the controller 200 to select among a plurality of settings. For example, the bypass switch 208 may allow the user to indicate the controller 200 should provide no power on the power outputs 204, should provide maximum power to the power outputs 204, should intelligently provide power to the power outputs 204, and a remote setting that indicates the controller 200 should follow instructions sent from a computing device 102 and/or a server 104. The controller 200 also includes mounting tabs 210 that allow the controller to be coupled with a structure. In one example, the mounting tabs 210 are used to attach the controller 200 to the vehicle 106. In another example, the mounting tabs 210 are used to attach the controller 200 externally to the vehicle 106.

As an example of operation of the controller 200, the controller 200 may activate a heating element 114 associated with an oil pan any time the temperature is below 20° F. The controller 200 may activate a heating element 114 associated with an engine block heater when the temperature is below 10° F. The controller 200 may increase the amount of heat provided by the heating element 114 gradually until the temperature drops below −10° F., at which point the controller 200 will operate the heating element 114 associated with the engine block at full capacity. The controller 200 may activate a heating element 114 associated with a battery when the temperature drops below −20° F. Also, the controller 200 may activate a heating element associated with a transmission when the temperature drops below −20° F. While specific temperatures are provided for ease of explanation, a person skilled in the art would appreciate that any temperature may be used to activate the heating elements 114 and should not be limited to the aforementioned examples. Further, while specific components of the vehicle 106 are described as receiving heat from a heating element 114, a person skilled in the art would appreciate that any component 110 of the vehicle 106 may receive heat from a heating element 114 and the disclosure should not be limited to the above examples.

Figure 3:
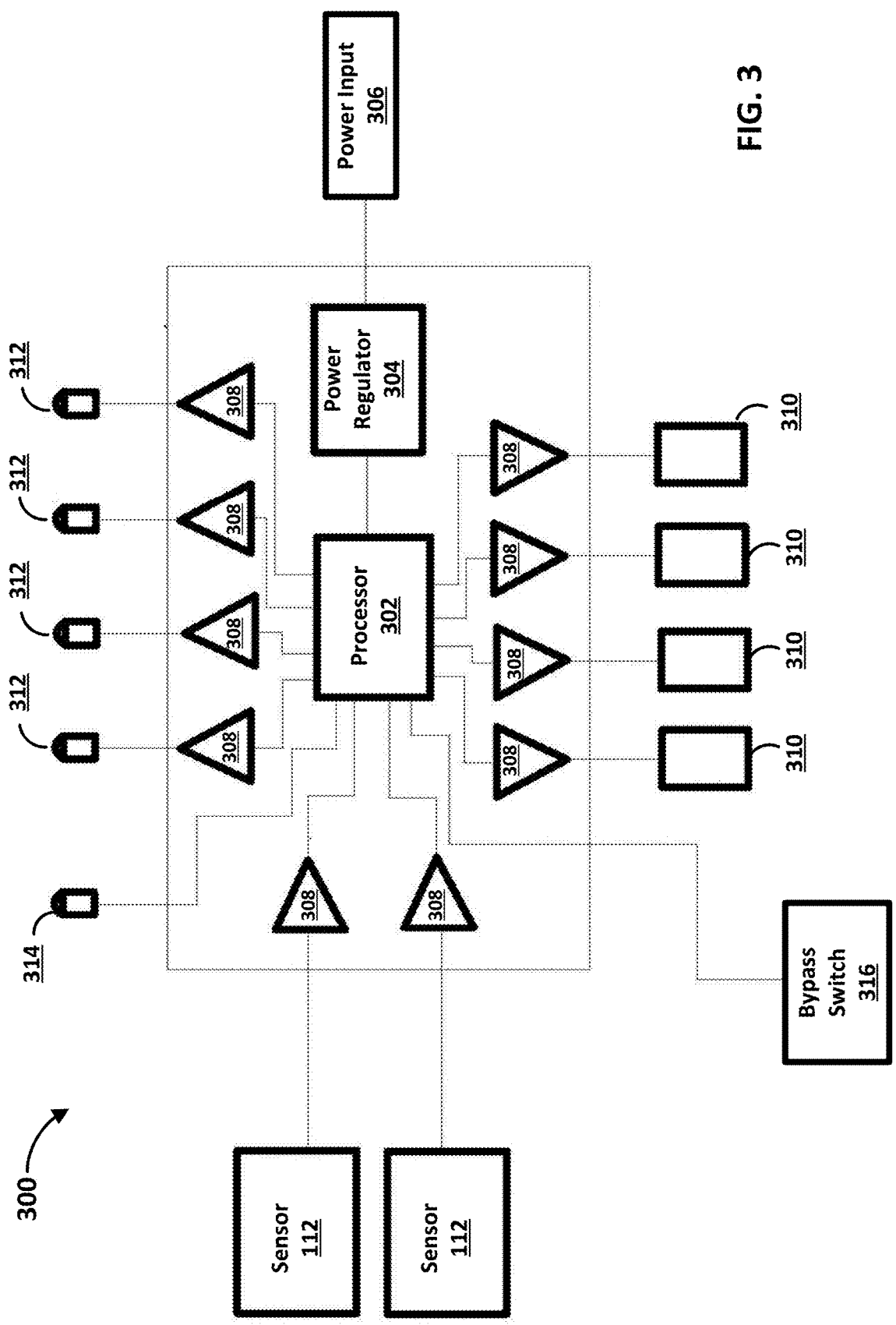
FIG. 3 is a schematic diagram illustrating an exemplary device.

FIG. 3 illustrates a schematic for an exemplary controller 300 (e.g., the controller 108 of FIG. 1 and/or the controller 200 of FIG. 2). As shown, the controller 300 includes a processor 302. In one example, the processor 302 includes the capabilities of the controller 108. For example, the processor 302 may include memory and software for controlling the heating elements 114 of the vehicle 106. The processor 302 is coupled with a power regulator 304 that manages the power input 306. The controller 300 includes a plurality of electronic buffers 308 to control the power used throughout the controller 300. In one example, the electronic buffers 308 are switches that may be activated to provide power to the various components of the controller 300 or may be deactivated to prevent power being supplied to the various components of the controller 300. The controller 300 includes a plurality of power outputs 310. The power outputs 310 may be coupled with heating elements 114 of the vehicle 106. The controller 300 also includes a plurality sensors 112 for measuring data.

The controller 300 can comprise a plurality of light emitting diodes (LEDs) 312 that indicate the status of a respective power outputs 310. Each of the LEDs 312 is associated with each of the power outputs 310 to indicate the individual status of the power outputs 310. That is, the power outputs 310 may be selectively activated and the LEDs 312 indicate this to a user of the controller 300. For example, the LEDs 312 may provide green light to indicate power is being provided to the power outputs 310. Alternatively, the LEDs 312 may provide red light to indicate that power is not being provided to the power outputs 310. The controller 300 also includes a status LED 314. The status LED 314 may provide light based on a status of the controller 300 to indicate to a user whether the controller 300 is working properly. For example, the LED 314 may provide green light if the controller 300 is operating properly. Alternatively, the LED 314 may provide red light to indicate the controller 300 is not operating properly. In this manner, a user of the controller 300 can visually determine the status of the controller 300.

The controller 300 includes a bypass switch 316. In one example, the bypass switch 316 allows a user of the controller 300 to select among a plurality of settings. For example, the bypass switch 316 may allow the user to indicate that the controller 300 should provide no power on the power outputs 310, should provide maximum power to the power outputs 310, should intelligently provide power to the power outputs 310, and/or a remote setting that indicates the controller 300 should follow instructions sent from a computing device (e.g., the computing device 102 and/or the server 104 of FIG. 1). In this manner, the bypass switch 316 provides the user of the controller 300 with one way to control the operation of the controller 300.

Figure 4:
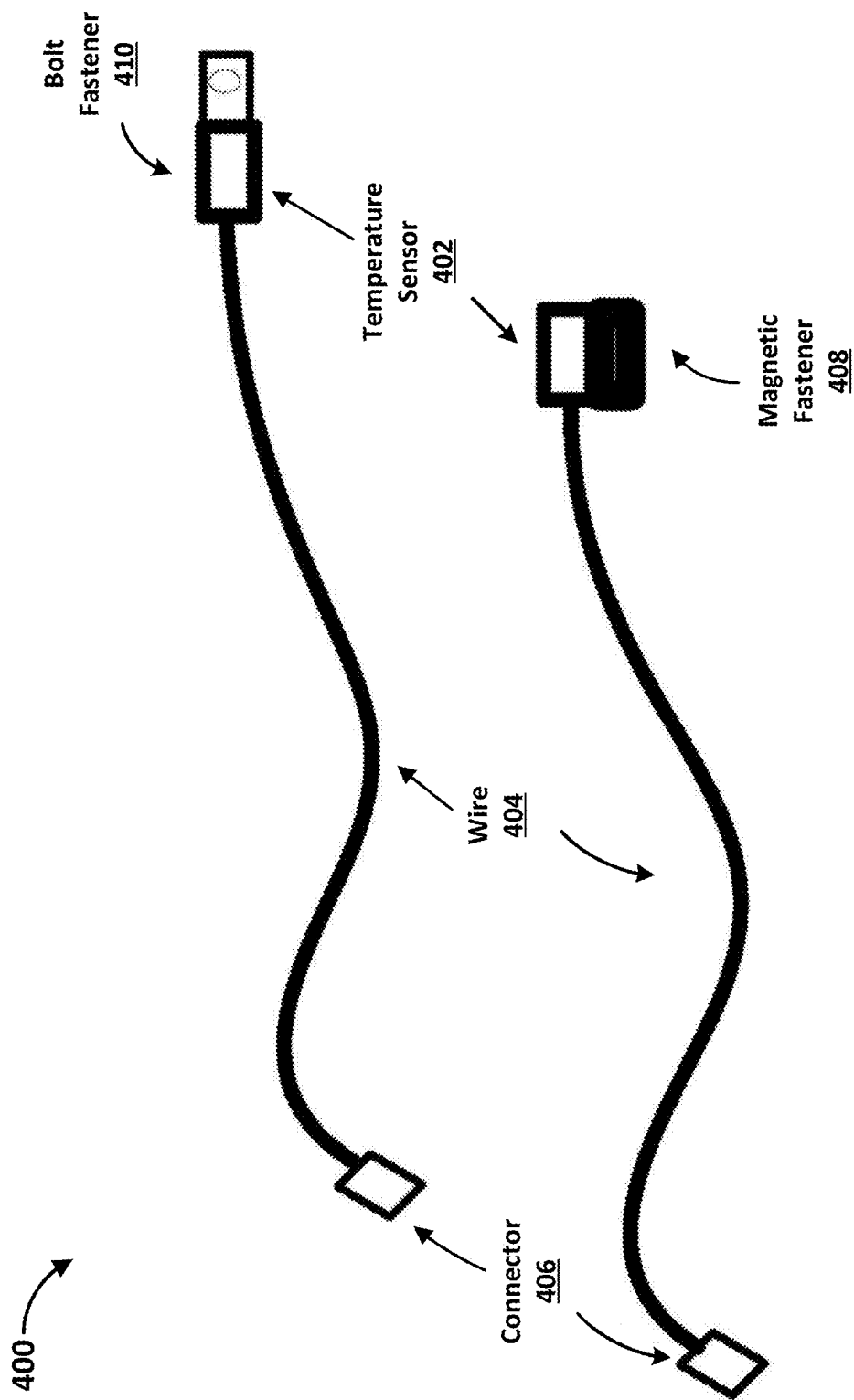
FIG. 4 is a diagram illustrating an exemplary sensor.

FIG. 4 illustrates an exemplary embodiment of sensors 400. In one example, the sensors 112 include the capability of the sensors 400. As shown, the sensors 400 each include a temperature sensor 402. While temperature sensors 402 were used for ease of explanation, a person skilled in the art would appreciate that any type of sensor may be used. The sensors 400 include a wire 404 that couples a connector 406 to the temperature sensors 402. In one example, the connectors 406 couple the sensors 400 with a controller (e.g., the controller 108 of FIG. 1, the controller 200 of FIG. 2, and/or the controller 300 of FIG. 3). The sensors 400 can include two different mounting methods for the temperature sensors 402. Specifically, a magnetic fastener 408 is shown that would allow the temperature sensor 402 to be mounted to any ferromagnetic material. Further, a bolt fastener 410 is shown that would allow the temperature sensor 402 to be mounted via a bolt to a device. While a magnetic fastener 408 and a bolt fastener are shown for ease of explanation, a person skilled in the art would appreciate that any fastening method may be used to couple the sensors 400 with an object.

Figure 5:
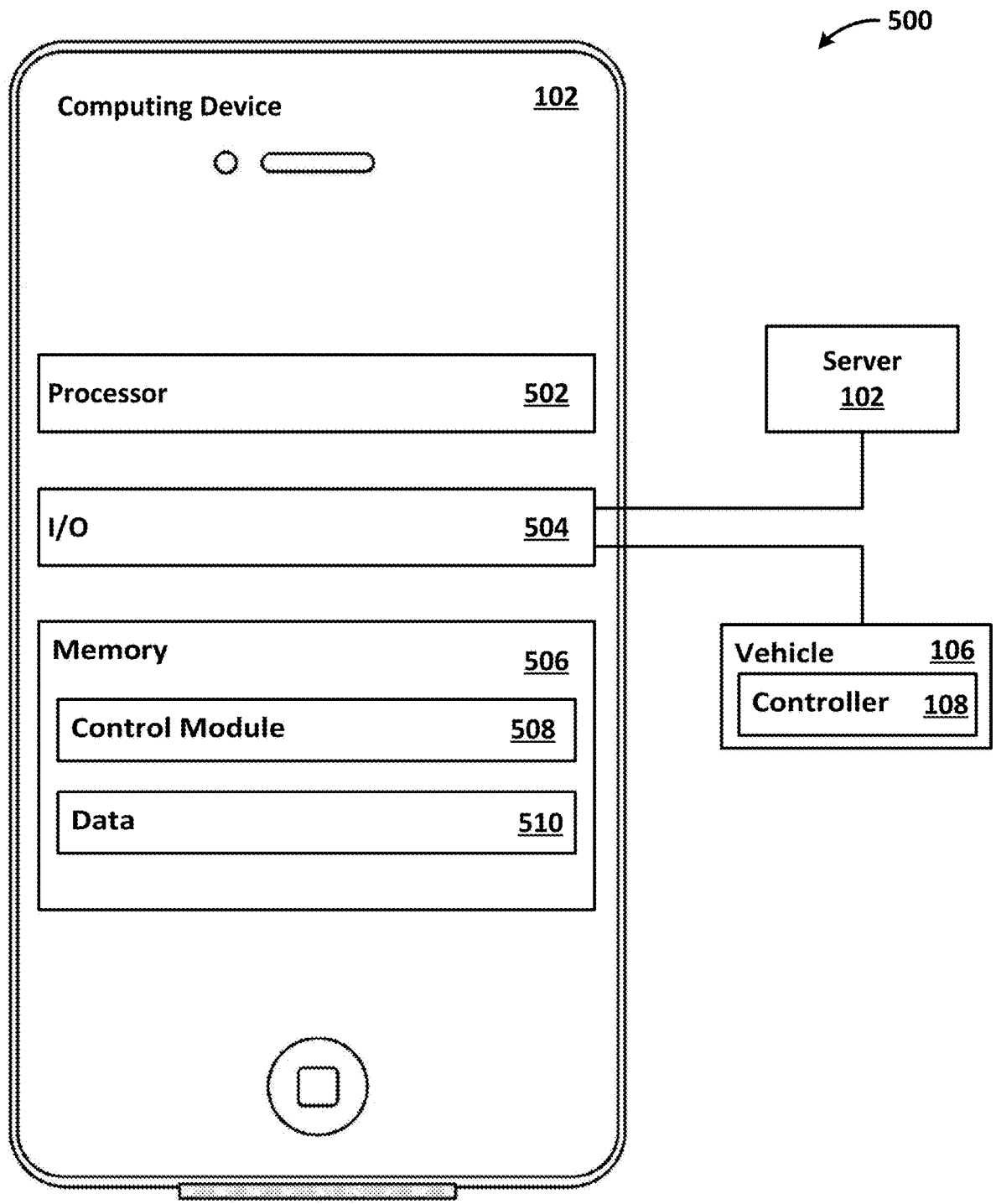
FIG. 5 is a block diagram illustrating an exemplary system.

FIG. 5 illustrates an exemplary system 500. As shown, the computing device 102 comprises a processor 502, an input output interface (I/O) 504, and a memory 506. In some examples, the computing device 102 can include additional parts such as global positioning system (GPS), a battery, motion detectors, audio devices (e.g., speakers), and so forth. While a single processor 502 is shown for ease of explanation, a person skilled in the art would appreciate that the computing device 102 may include any number of processors 502.

The processor 502 may preform various tasks, such as retrieving information stored in the memory 506, and executing various software modules. For example, the processor 502 can execute the control module 508 that provides instructions and/or settings to the controller 108.

As shown, the computing device 102 is communicatively coupled via the I/O 504 with the server 104 and/or the vehicle 106. For example, the computing device 102 can be communicatively coupled with the controller 108 of the vehicle 106. The I/O 504 may include any type of suitable hardware for communication with devices. For example, the I/O 504 may include wireless communications, including but not limited to, Wi-Fi, Bluetooth, cellular, Radio Frequency (RF), as well as direct connection interfaces such as Ethernet and Universal Serial Bus (USB).

The memory 506 includes a control module 508 and data 510. The memory 506 may comprise a variety of computer readable media. As an example, computer readable media can be any available media and comprises, for example and not meant to be limiting, both volatile and non-volatile media, removable and non-removable media. The memory 506 can comprise computer readable media in the form of volatile memory, such as random access memory (RAM), and/or non-volatile memory, such as read only memory (ROM).

In another example, the memory 506 can also comprise other removable/non-removable, volatile/non-volatile computer storage media. The memory 506 can provide non-volatile storage of computer code, computer readable instructions, data structures, program modules, and other data for the computing device 102. For example, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

The memory 506 may store software that is executable by the processor 502, including operating systems, applications, and related software. The memory 506 also includes data 510. The data 510 may include data received from the sensors 112, settings or preferences for a user, or any suitable type of data. While not shown, a person skilled in the art would appreciate that the memory 506 may also include additional software and/or firmware for operating the computing device 102.

In one example, the control module 508 includes the capability to operate the controller 108. For example, the control module 508 includes the capability to communicate with the controller 108 and provide operational instructions, settings, and/or preferences to the controller 108. As an example, the control module 508 may receive data from one of the sensors 112, and the control module 508 may use the data to determine how one of the components 110 and/or heating elements 114 should be controlled. The control module 508 may instruct the controller 108 to selectively activate one or more of the heating elements 114 dynamically based on the air temperature. The control module 508 may instruct the controller 108 to automatically activate the components 110 and the heating elements 114 based on data provided by the sensors 112. For example, the control module 508 can receive data from a temperature sensor indicating the ambient temperature is 20 degrees Fahrenheit and may automatically transmit instructions to the controller 108 to activate one of the heating elements 114. As another example, the control module 508 can receive input from a user that instructs the control module 508 to have the controller 108 activate at least one of the heating elements 114.

As another example, the control module 508 can transmit temperature settings to the controller 108 that indicate a temperature the controller 108 should activate one or more of the heating elements 114 in order to increase the temperature of one or more of the components 110. As one example, the control module 508 may provide start and stop times that the controller 108 should activate the heating elements 114. As another example, the control module 508 may indicate times that the controller 108 should start dynamically managing the heating elements 114. In one example, a user of the control module 508 actively selects the instructions or settings that are transmitted to the controller 108. In another example, the control module 508 dynamically decides the instructions or settings that are transmitted to the controller 108 without input from a user. In another example, the control module 508 receives input from a user indicating the preferences and/or settings the user would like the control module 508 to implement. The control module 508 may then automatically transmit instructions to the controller 108 based on the user indicated preferences and/or settings. In one example, the user of the control module 508 selects specific components 110 or heating elements 114 to activate.

Figure 6:
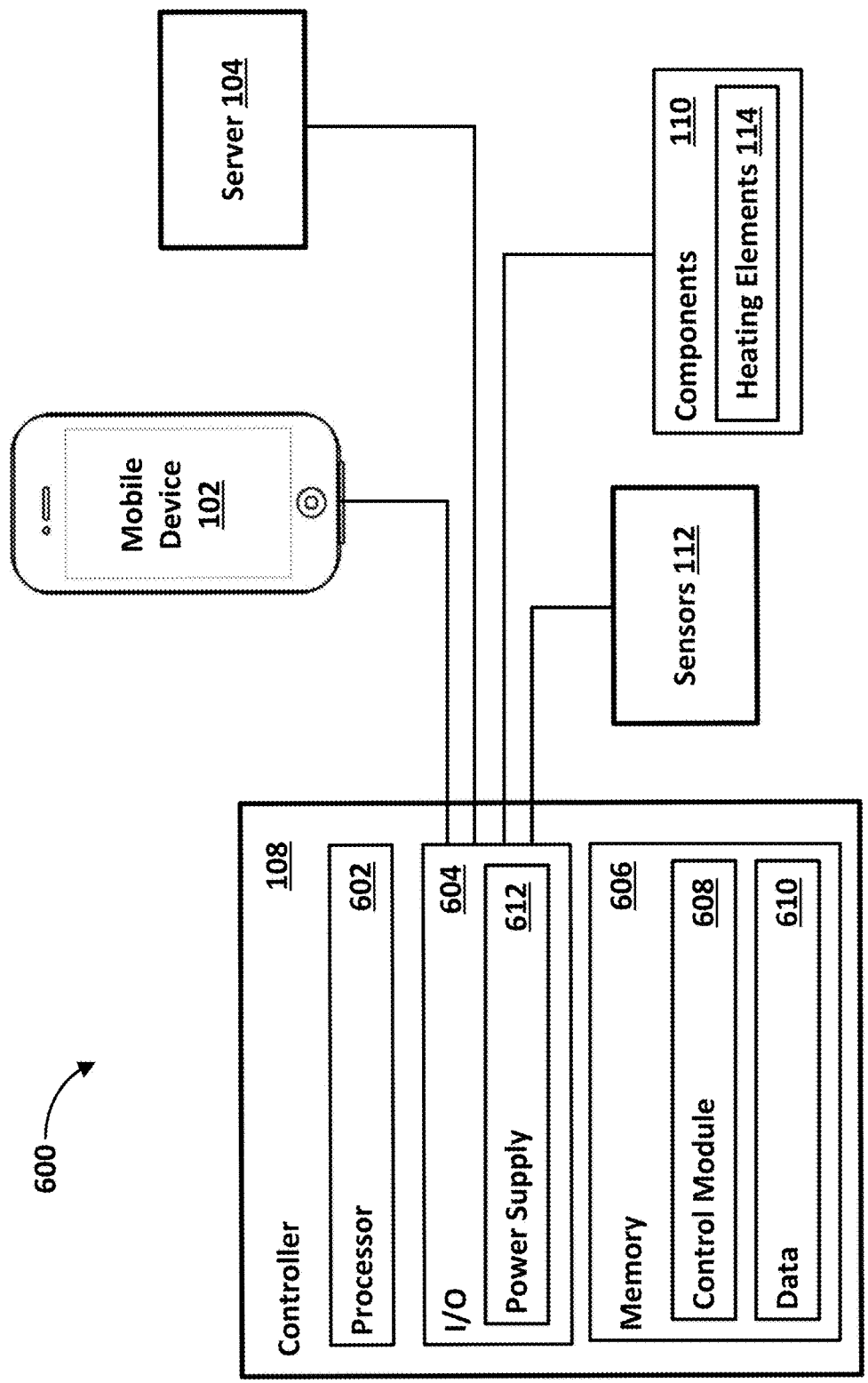
FIG. 6 is a block diagram illustrating an exemplary system.

FIG. 6 illustrates an exemplary system 600. As shown, the controller 108 comprises a processor 602, an input output interface (I/O) 604, and a memory 606. In some examples, the controller 108 can include additional parts such as global positioning system (GPS), a battery, motion detectors, audio devices (e.g., speakers), and so forth. While a single processor 502 is shown for ease of explanation, a person skilled in the art would appreciate that the controller 108 may include any number of processors 602.

The processor 602 may preform various tasks, such as retrieving information stored in the memory 606, and executing various software modules. For example, the processor 602 can execute the control module 608 that provides instructions and/or settings to the controller 108.

As shown, the controller 108 is communicatively coupled via the I/O 604 with the computing device 102, the server 104, the components 110, the sensors 112, and the heating elements 114. The I/O 604 may include any type of suitable hardware for communication with any electronic device. For example, the I/O 604 may include includes wireless communications, including but not limited to, Wi-Fi, Bluetooth, cellular, Radio Frequency (RF), as well as direct connection or hardwired interfaces such as Ethernet and Universal Serial Bus (USB).

The controller 108 may also communicate with services external to the system 600. For example, the controller 108 may receive a signal from an external device (e.g., the mobile device 102, the server 104, and/or another device) that provides operating instructions for the controller 108. As an example, the controller 108 may control power provided to an electronic device (e.g., a refrigerator, an air conditioning system, an electric water heater, etc.). The controller 108 may receive a message from the external device that indicates the controller 108 should provide power to the electronic device or cut power to the electronic device. For example, an electric power company may provide the controller 108 to its customers in order to control power to the electronic device. The electric power company may determine that a power distribution network that the electric power company controls is nearing condition for a fault (e.g., the power distribution network is at full capacity, conditions for a power outage are indicated, device failure in the power distribution network, etc.), and may send a signal to the controller 108 indicating that the controller 108 needs to cut power to the electronic device associated with the controller 108 to reduce the load on the power distribution network. While a single electronic device may not make a major impact, if each customer has one or two electronic devices disabled from drawing power from the distribution network and the electric power company provides service to 500,000 customers, the reduction in power draw may stabilize the power distribution network.

As another example, the controller 108 can be configured to only provide power to the electronic device when the costs for electricity reach a certain threshold. For example, a customer may desire to only provide power to their freezer when electricity is cost effective (e.g., lower cost) because a freezer can go several hours without electricity and still maintain temperature. Thus, the customer may indicate to the controller 108 to communicate with the external service (e.g., the power company) to determine the optimal time to operate the freezer. The controller 108 can then communicate (e.g., send and receive messages comprising data) with the external service to determine when to provide power and when to not provide power to the electronic device. Accordingly, the controller 108 can control power provided to one or more electronic devices based on communications received from an external service.

The memory 606 includes a control module 608 and data 610. The memory 606 typically comprises a variety of computer readable media. As an example, readable media can be any available media and comprises, for example and not meant to be limiting, both volatile and non-volatile media, removable and non-removable media. The memory 606 can comprise computer readable media in the form of volatile memory, such as random access memory (RAM), and/or non-volatile memory, such as read only memory (ROM).

In another example, the memory 606 can also comprise other removable/non-removable, volatile/non-volatile computer storage media. The memory 606 can provide non-volatile storage of computer code, computer readable instructions, data structures, program modules, and other data for the controller 108. For example, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

The memory 606 may store software that are executable by the processor 502, including operating systems, applications, and related software. The memory 606 also includes data 610. The data 610 may include data received from the sensors 112, settings or preferences for a user, or any suitable type of data. While not shown, a person skilled in the art would appreciate that the memory 606 may also include additional software and/or firmware for operating the controller 108.

In one example, the control module 608 includes the capability to operate the controller 108. For example, the control module 608 can determine operational instructions and/or preferences for the controller 108. As an example, control module 608 may receive data from one of the sensors 112, and the control module 608 may use the data to determine how one of the components 110 and/or heating elements 114 should be operated. The control module 608 may dynamically instruct the one or more of the heating elements 114 to activate based on an ambient temperature and/or a temperature of a component. The control module 608 may activate the components 110 and the heating elements 114 based on data provided by the sensors 112. For example, the control module 608 can receive data from a temperature sensor indicating the ambient temperature is 20 degrees Fahrenheit and may automatically transmit instructions to one of the heating elements 114 to activate. As another example, the control module 608 can receive input from a user that instructs the control module 608 to activate at least one of the heating elements 114.

As another example, the control module 608 can access temperature settings stored in data 610 that indicate at what temperature the controller 108 should activate one or more of the heating elements 114 in order to increase the temperature of one or more of the components 110. As one example, the control module 608 may use start and stop times that the heating elements 114 should be activated. As another example, the control module 608 may indicate times that the heating elements 114 should be dynamically managed. In one example, a user of the control module 608 actively selects the instructions or settings regarding activation of the heating elements 114. In another example, the control module 608 dynamically decides the instructions or settings without input from a user. In another example, the control module 608 receives input from a user indicating the preferences and/or settings the user would like the control module 608 to implement. The control module 608 may then automatically transmit instructions to the components 110 and/or heating elements 114 based on the user indicated preferences and/or settings. In one example, the user of the control module 608 selects specific components 110 or heating elements 114 to activate.

Figure 7:
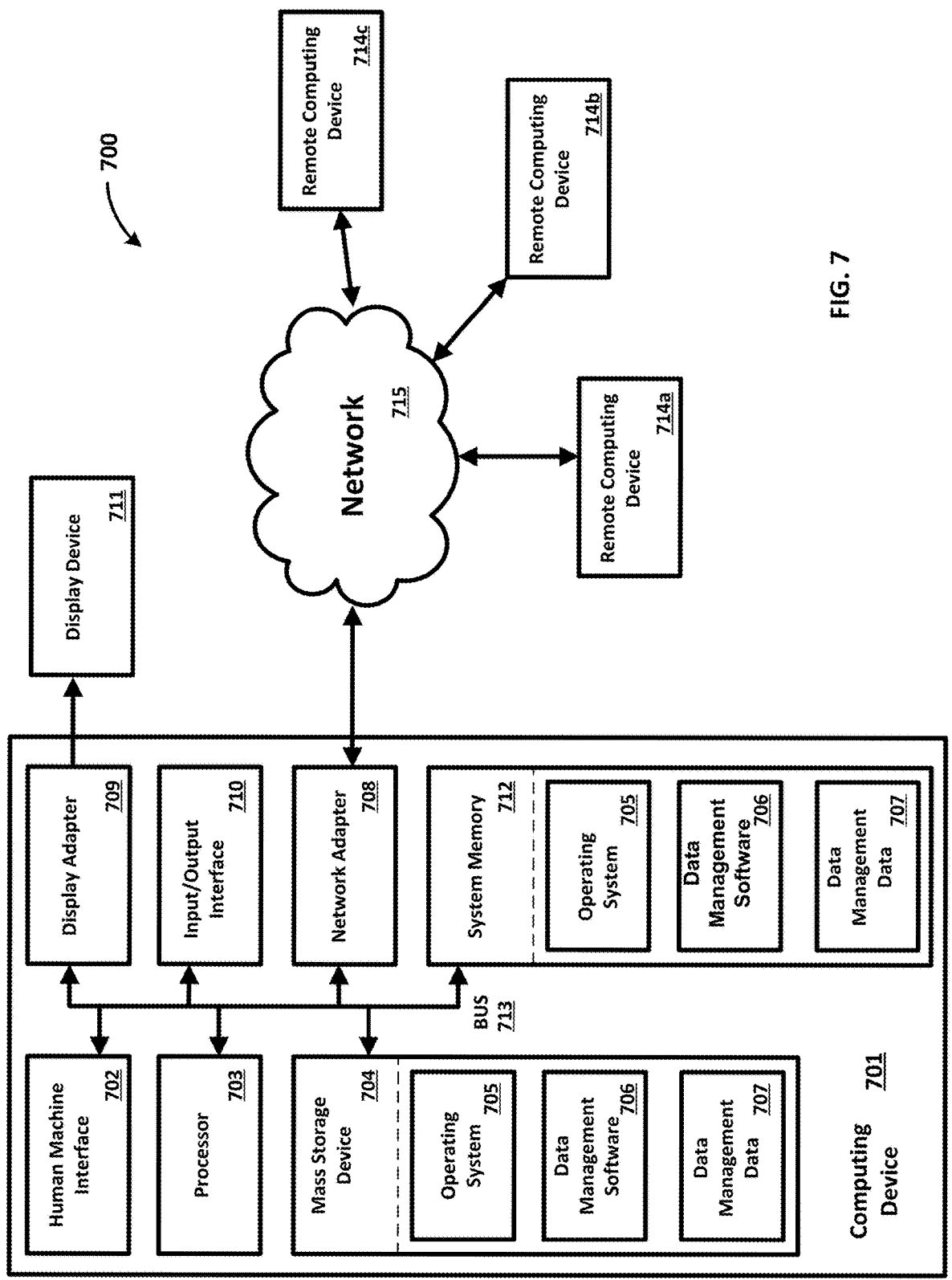
FIG. 7 is a block diagram illustrating an example computing system in which the present methods and systems can operate.

FIG. 7 illustrates an example of an operating environment 700 including a computing device 701. While FIG. 7 is described with reference to a computing device 701 for ease of explanation, it is to be understood that the computing device 102, the server 104, the vehicle 106, the controller 108, and the components 110 may include any and all of the capabilities described below. The operating environment 700 is only an example of an operating environment and is not intended to suggest any limitation as to the scope of use or functionality of operating environment architecture. Neither should the operating environment 700 be interpreted as having any dependency or requirement relating to any one or combination of components illustrated in the operating environment 700.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computing device 701. The computing device 701 can comprise one or more components, such as one or more processors 703, a system memory 712, and a bus 713 that couples various components of the computing device 701 including the one or more processors 703 to the system memory 712. In the case of multiple processors 703, the system can utilize parallel computing.

The bus 713 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and one or more of the components of the computing device 701, such as the one or more processors 703, a mass storage device 704, an operating system 705, data management software 706, data management data 707, a network adapter 708, a system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computing device 701 typically comprises a variety of computer readable media. As an example, readable media can be any available media that is accessible by the computing device 701 and comprises, for example and not meant to be limiting, both volatile and non-volatile media, removable and non-removable media. The system memory 712 can comprise computer readable media in the form of volatile memory, such as random access memory (RAM), and/or non-volatile memory, such as read only memory (ROM). The system memory 712 typically can comprise data such as data management data 707 and/or program modules such as operating system 705 and data management software 706 that are accessible to and/or are operated on by the one or more processors 703.

In another example, the computing device 701 can also comprise other removable/non-removable, volatile/non-volatile computer storage media. The mass storage device 704 can provide non-volatile storage of computer code, computer readable instructions, data structures, program modules, and other data for the computing device 701. For example, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and data management software 706. One or more of the operating system 705 and data management software 706 (or some combination thereof) can comprise program modules and the data management software 706. The data management data 707 can also be stored on the mass storage device 704. The data management data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 715.

In one example, the data management software 706 includes the capability to operate the controller 108. For example, the data management software 706 includes the capability to communicate with the controller 108 and provide operational instructions and/or preferences to the controller 108. As an example, data management software 706 may receive data from one of the sensors 112, and the data management software 706 may use the data to determine how one of the components 110 and/or heating elements 114 should be controlled. The data management software 706 may instruct the controller 108 to selectively activate one or more of the heating elements 114 dynamically based on the air temperature. The data management software 706 may instruct the controller 108 automatically activate the components 110 and the heating elements 114 based on data provided by the sensors 112. For example, the data management software 706 can receive data from a temperature sensor indicating the ambient temperature is 20 degrees Fahrenheit and may automatically transmit instructions to the controller 108 to activate one of the heating elements 114. As another example, the data management software 706 can receive input from a user that instructs the data management software 706 to have the controller 108 activate at least one of the heating elements 114.

As another example, the data management software 706 can transmit temperature settings to the controller 108 that indicate at what temperature the controller 108 should activate one or more of the heating elements 114 in order to increase the temperature of one or more of the components 110. As one example, the data management software 706 may provide start and stop times that the controller 108 should activate the heating elements 114. As another example, the data management software 706 may indicate times that the controller 108 should start dynamically managing the heating elements 114. In one example, a user of the data management software 706 actively selects the instructions or settings that are transmitted to the controller 108. In another example, the data management software 706 dynamically decides the instructions or settings that are transmitted to the controller 108 without input from a user. In another example, the data management software 706 receives input from a user indicating the preferences and/or settings the user would like the data management software 706 to implement. The data management software 706 may then automatically transmit instructions to the controller 108 based on the user indicated preferences and/or settings. In one example, the user of the data management software 706 selects specific components 110 or heating elements 114 to activate.

In one example, the data management software 706 is a web based or telecommunications based server that has an associated interface that a user can access which controls the operation of the vehicle 106, the controller 108, the components 110, and the heating elements 114.

In another example, the user can enter commands and information into the computing device 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 703 via a human machine interface 702 that is coupled to the bus 713, but can be connected by other interface and bus structures, such as a parallel port, game port, an IEEE 1394 Port (also known as a Firewire port), a serial port, network adapter 708, and/or a universal serial bus (USB).

In yet another example, a display device 711 can also be connected to the bus 713 via an interface, such as a display adapter 709. It is contemplated that the computing device 701 can have more than one display adapter 709 and the computing device 701 can have more than one display device 711. For example, a display device 711 can be a monitor, an LCD (Liquid Crystal Display), light emitting diode (LED) display, television, smart lens, smart glass, and/or a projector. In addition to the display device 711, other output peripheral devices can comprise components such as speakers (not shown) and a printer (not shown) which can be connected to the computing device 701 via Input/Output Interface 710. Any step and/or result of the methods can be output in any form to an output device. Such output can be any form of visual representation, including, but not limited to, textual, graphical, animation, audio, tactile, and the like. The display 711 and the computing device 701 can be part of one device, or separate devices.

The computing device 701 can operate in a networked environment using logical connections to one or more remote computing devices 714a,b,c. By way of example, a remote computing device 714a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. As an example, remote computing devices can be the computing device 102, the server 104, the vehicle 106, the controller 108, the components 110, and a heater associated with the vehicle 106. Logical connections between the computing device 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are shown herein as discrete blocks, although it is recognized that such programs and components can reside at various times in different storage components of the computing device 701, and are executed by the one or more processors 703 of the computing device 701. An implementation of data management software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 8:
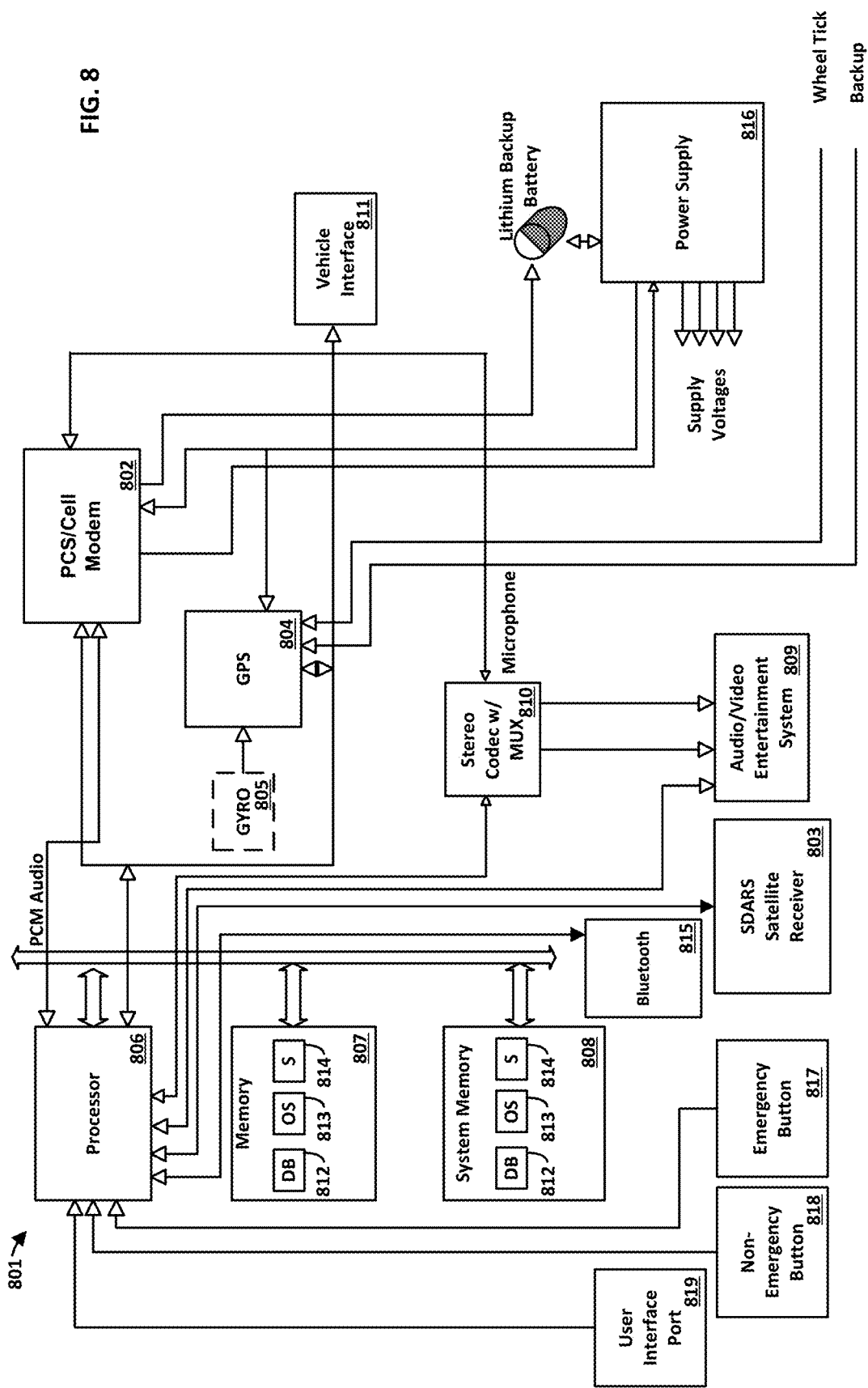
FIG. 8 is a block diagram illustrating an exemplary system.

FIG. 8 illustrates an apparatus comprising a telematics control unit. The apparatus can be installed in a vehicle. Such vehicles include, but are not limited to, personal and commercial automobiles, motorcycles, transport vehicles, watercraft, aircraft, and the like. For example, an entire fleet of a vehicle manufacturer's vehicles can be equipped with the apparatus. The apparatus 801, is also referred to herein as the VTU 801. In one example, the apparatus 801 comprises the controller 108 and includes all the capabilities of the controller 108.

In an aspect, all components of the telematics unit can be contained within a single box and controlled with a single core processing subsystem. In another aspect, the components can be distributed throughout a vehicle. Each of the components of the apparatus can be separate subsystems of the vehicle, for example, a communications component such as a SDARS, or other satellite receiver, can be coupled with an entertainment system of the vehicle.

An exemplary apparatus 801 is illustrated in FIG. 8. This exemplary apparatus is only an example of an apparatus and is not intended to suggest any limitation as to the scope of use or functionality of operating architecture. Neither should the apparatus be necessarily interpreted as having any dependency or requirement relating to any one or combination of components illustrated in the exemplary apparatus. The apparatus 801 can comprise one or more communications components. Apparatus 801 illustrates communications components (modules) PCS/Cell Modem 802 and SDARS receiver 803. These components can be referred to as vehicle mounted transceivers when located in a vehicle. PCS/Cell Modem 802 can operate on any frequency available in the country of operation, including, but not limited to, the 850/1900 MHz cellular and PCS frequency allocations. The type of communications can include, but is not limited to GPRS, EDGE, UMTS, 1×RTT or EV-DO. The PCS/Cell Modem 802 can be a Wi-Fi or mobile WIMAX implementation that can support operation on both licensed and unlicensed wireless frequencies. The apparatus 801 can comprise an SDARS receiver 803 or other satellite receiver. SDARS receiver 803 can utilize high powered satellites operating at, for example, 2.35 GHz to broadcast digital content to automobiles and some terrestrial receivers, generally demodulated for audio content, but can contain digital data streams.

PCS/Cell Modem 802 and SDARS receiver 803 can be used to update an onboard database 812 contained within the apparatus 801. Updating can be requested by the apparatus 801, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 804 can receive position information from a constellation of satellites operated by the U.S. Department of Defense. Alternately, the GPS receiver 804 can be a GLONASS receiver operated by the Russian Federation Ministry of Defense, or any other positioning device capable of providing accurate location information (for example, LORAN, inertial navigation, and the like). GPS receiver 804 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, the apparatus 801 can comprise a MEMS gyro 805 for measuring angular rates and wheel tick inputs for determining the exact position based on dead-reckoning techniques. This functionality is useful for determining accurate locations in metropolitan urban canyons, heavily tree-lined streets and tunnels.

In an aspect, the GPS receiver 804 can activate on ignition or start of motion. The GPS receiver 804 can go into idle on ignition off or after ten minutes without motion. Time to first fix can be <45 s 90% of the time. For example, this can be achieved either through chipset selection or periodic wake-up.

One or more processors 806 can control the various components of the apparatus 801. Processor 806 can be coupled to removable/non-removable, volatile/non-volatile computer storage media. By way of example, FIG. 8 illustrates memory 807, coupled to the processor 806, which can provide non-volatile storage of computer code, computer readable instructions, data structures, program modules, and other data for the computer 801. For example and not meant to be limiting, memory 807 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Data obtained and/or determined by processor 806 can be displayed to a vehicle occupant and/or transmitted to a remote processing center. This transmission can occur over a wired or a wireless network. For example, the transmission can utilize PCS/Cell Modem 802 to transmit the data. The data can be routed through the Internet where it can be accessed, displayed and manipulated.

The processing of the disclosed systems and methods can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored on the memory 807, including by way of example, an operating system 813 and reporting software 814. Each of the operating system 813 and reporting software 814 (or some combination thereof) can comprise elements of the programming and the reporting software 814. Data can also be stored on the memory 807 in database 812. Database 812 can be any of one or more databases known in the art. Examples of such databases comprise, DB2®, Microsoft® Access, Microsoft® SQL Server, Oracle®, mySQL, PostgreSQL, and the like. The database 812 can be centralized or distributed across multiple systems.

In some aspects, data can be stored and transmitted in loss-less compressed form and the data can be tamper-proof Non-limiting examples of data that can be collected are as follows. After a connection is established the protocol being used can be stored. A timestamp can be recorded on ignition for one or more trips. Speed every second during the trip. Crash events can be stored (for example, as approximated via OBD II speed). By way of example, GPS related data that can be recorded during one or more trips can comprise one or more of, time, latitude, longitude, altitude, speed, heading, horizontal dilution of precision (HDOP), number of satellites locked, and the like. In one aspect, recorded data can be transmitted from the apparatus to a back-office for integrity verification and then via, for example, a cellular network. Once validated, data can be pushed to a company via established web-services & protocols.

By way of example, the operating system 813 can be a Linux (Unix-like) operating system. One feature of Linux is that it includes a set of "C" programming language functions referred to as "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

It is recognized that such programs and components reside at various times in different storage components of the apparatus 801, and are executed by the processor 806 of the apparatus 801. An implementation of reporting software 814 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

As shown, system memory 808, coupled to the processor 806, which can comprise computer readable media in the form of volatile memory, such as random access memory (RAM, SDRAM, and the like), and/or non-volatile memory, such as read only memory (ROM). The system memory 808 typically contains data and/or program modules such as operating system 813 and reporting software 814 that are immediately accessible to and/or are presently operated on by the processor 806. The operating system 813 can comprise a specialized task dispatcher, slicing available bandwidth among the necessary tasks at hand, including communications management, position determination and management, entertainment radio management, SDARS data demodulation and assessment, power control, and vehicle communications.

The processor 806 can control additional components within the apparatus 801 to allow for ease of integration into vehicle systems. The processor 806 can control power to the components within the apparatus 801, for example, shutting off GPS receiver 804 and SDARS receiver 803 when the vehicle is inactive, and alternately shutting off the PCS/Cell Modem 802 to conserve the vehicle battery when the vehicle is stationary for long periods of inactivity. The processor 806 can also control an audio/video entertainment subsystem 809 and comprise a stereo codec and multiplexer 810 for providing entertainment audio and video to the vehicle occupants, for providing wireless communications audio (PCS/Cell phone audio), speech recognition from the driver compartment for manipulating the SDARS receiver 803 and PCS/Cell Modem 802 phone dialing, and text to speech and pre-recorded audio for vehicle status annunciation.

The apparatus 801 can interface and monitor various vehicle systems and sensors to determine vehicle conditions. Apparatus 801 can interface with a vehicle through a vehicle interface 811. The vehicle interface 811 can include, but is not limited to, OBD (On Board Diagnostics) port, OBD-II port, CAN (Controller Area Network) port, and the like. A cable can be used to connect the vehicle interface 811 to a vehicle. Any type of cable capable of connecting to a vehicle diagnostics port can be used. In one aspect, an OBD II connector cable can be used that follows the J1962 trapezoidal connector specification, the J1939 or J1708 round connector specifications, and the like. A communication protocol such as, J1850 PWM, J1850 VPW, ISO9141-2, ISO14230-4, and the like can be used to collect data through the vehicle interface 811. The vehicle interface 811, allows the apparatus 801 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any data obtained from any discrete sensor that contributes to the operation of the vehicle engine and drive-train computer. Additionally CAN interfacing can eliminate individual dedicated inputs to determine brake usage, backup status, and it can allow reading of onboard sensors in certain vehicle stability control modules providing gyro outputs, steering wheel position, accelerometer forces and the like for determining driving characteristics. The apparatus 801 can interface directly with a vehicle subsystem or a sensor, such as an accelerometer, gyroscope, airbag deployment computer, and the like. Data obtained from, and processed data derived from, the various vehicle systems and sensors can be transmitted to a central monitoring station via the PCS/Cell Modem 802.

Communication with a vehicle driver can be through an infotainment (radio) head (not shown) or other display device (not shown). More than one display device can be used. Examples of display devices include, but are not limited to, a monitor, an LCD (Liquid Crystal Display), a projector, and the like. Audio/video entertainment subsystem 809 can comprise a radio receiver, FM, AM, Satellite, Digital and the like. Audio/video entertainment subsystem 809 can comprise one or more media players. An example of a media player includes, but is not limited to, audio cassettes, compact discs, DVD's, Blu-ray, HD-DVDs, Mini-Discs, flash memory, portable audio players, hard disks, game systems, and the like. Audio/video entertainment subsystem 809 can comprise a user interface for controlling various functions. The user interface can comprise buttons, dials, and/or switches. In certain embodiments, the user interface can comprise a display screen. The display screen can be a touch screen. The display screen can be used to provide information about the particular entertainment being delivered to an occupant, including, but not limited to Radio Data System (RDS) information, ID3 tag information, video, and various control functionality (such as next, previous, pause, etc.), websites, and the like. Audio/video entertainment subsystem 809 can utilize wired or wireless techniques to communicate to various consumer electronics including, but not limited to, cellular phones, laptops, PDAs, portable audio players (such as an iPod), and the like. Audio/video entertainment subsystem 809 can be controlled remotely through, for example, a wireless remote control, voice commands, and the like.

The methods, systems, and apparatuses provided can utilize a power management scheme ensuring that a consumer's car battery is not impaired under normal operating conditions. This can include battery backup support when the vehicle is off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable.

The apparatus 801 can receive power from power supply 816. The power supply can have many unique features necessary for correct operation within the automotive environment. One mode is to supple a small amount of power (typically less than 100 microamps) to at least one master controller that can control all the other power buses inside of the VTU 801. In an exemplary system, a low power low dropout linear regulator supplies this power to PCS/Cellular modem 802. This provides the static power to maintain internal functions so that it can await external user push-button inputs or await CAN activity via vehicle interface 811. Upon receipt of an external stimulus via either a manual push button or CAN activity, the processor contained within the PCS/Cellular modem 802 can control the power supply 816 to activate other functions within the VTU 801, such as GPS 804/GYRO 805, Processor 806/Memory 807 and 808, SDARS receiver 803, audio/video entertainment system 809, audio codec mux 810, and any other peripheral within the VTU 801 that does not require standby power.

In an exemplary system, there can be a plurality of power supply states. One state can be a state of full power and operation, selected when the vehicle is operating. Another state can be a full power relying on battery backup. It can be desirable to turn off the GPS and any other non-communication related subsystem while operating on the back-up batteries. Another state can be when the vehicle has been shut off recently, perhaps within the last 30 days, and the system maintains communications with a two-way wireless network for various auxiliary services like remote door unlocking and location determination messages. After the recent shut down period, it is desirable to conserve the vehicle battery by turning off almost all power except the absolute minimum in order to maintain system time of day clocks and other functions, waiting to be awakened on CAN activity. Additional power states are contemplated, such as a low power wakeup to check for network messages, but these are nonessential features to the operation of the VTU.

Normal operation can comprise, for example, the PCS/Cellular modem 802 waiting for an emergency pushbutton key-press or CAN activity. Once either is detected, the PCS/Cellular modem 802 can awaken and enable the power supply 816 as required. Shutdown can be similar wherein a first level shutdown turns off everything except the PCS/Cellular modem 802, for example. The PCS/Cellular modem 802 can maintain wireless network contact during this state of operation. The VTU 801 can operate normally in the state when the vehicle is turned off. If the vehicle is off for an extended period of time, perhaps over a vacation etc., the PCS/Cellular modem 802 can be dropped to a very low power state where it no longer maintains contact with the wireless network.

Additionally, in FIG. 8, subsystems can include a Bluetooth transceiver 815 that can be provided to interface with devices such as phones, headsets, music players, and telematics user interfaces. The apparatus can comprise one or more user inputs, such as emergency button 817 and non-emergency button 818. Emergency button 817 can be coupled to the processor 806. The emergency button 817 can be located in a vehicle cockpit and activated an occupant of the vehicle. Activation of the emergency button 817 can cause processor 806 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 818 can be coupled to the processor 806. One or more non-emergency buttons 818 can be located in a vehicle cockpit and activated an occupant of the vehicle. Activation of the one or more non-emergency buttons 818 can cause processor 806 to initiate a voice and data connection from the vehicle to a remote call center. Data such as GPS location and occupant personal information can be transmitted to the call center. The voice connection permits two way voice communication between a vehicle occupant and a call center operator. The call center operator can provide location based services to the vehicle occupant based on the data received and the vehicle occupant's desires. For example, a button can provide a vehicle occupant with a link to roadside assistance services such as towing, spare tire changing, refueling, and the like. In another embodiment, a button can provide a vehicle occupant with concierge-type services, such as local restaurants, their locations, and contact information; local service providers their locations, and contact information; travel related information such as flight and train schedules; and the like.

For any voice communication made through the VTU 801, text-to-speech algorithms can be used so as to convey predetermined messages in addition to or in place of a vehicle occupant speaking. This allows for communication when the vehicle occupant is unable or unwilling to communicate vocally.

In an aspect, apparatus 801 can be coupled to a telematics user interface located remote from the apparatus. For example, the telematics user interface can be located in the cockpit of a vehicle in view of vehicle occupants while the apparatus 801 is located under the dashboard, behind a kick panel, in the engine compartment, in the trunk, or generally out of sight of vehicle occupants.

Figure 9:
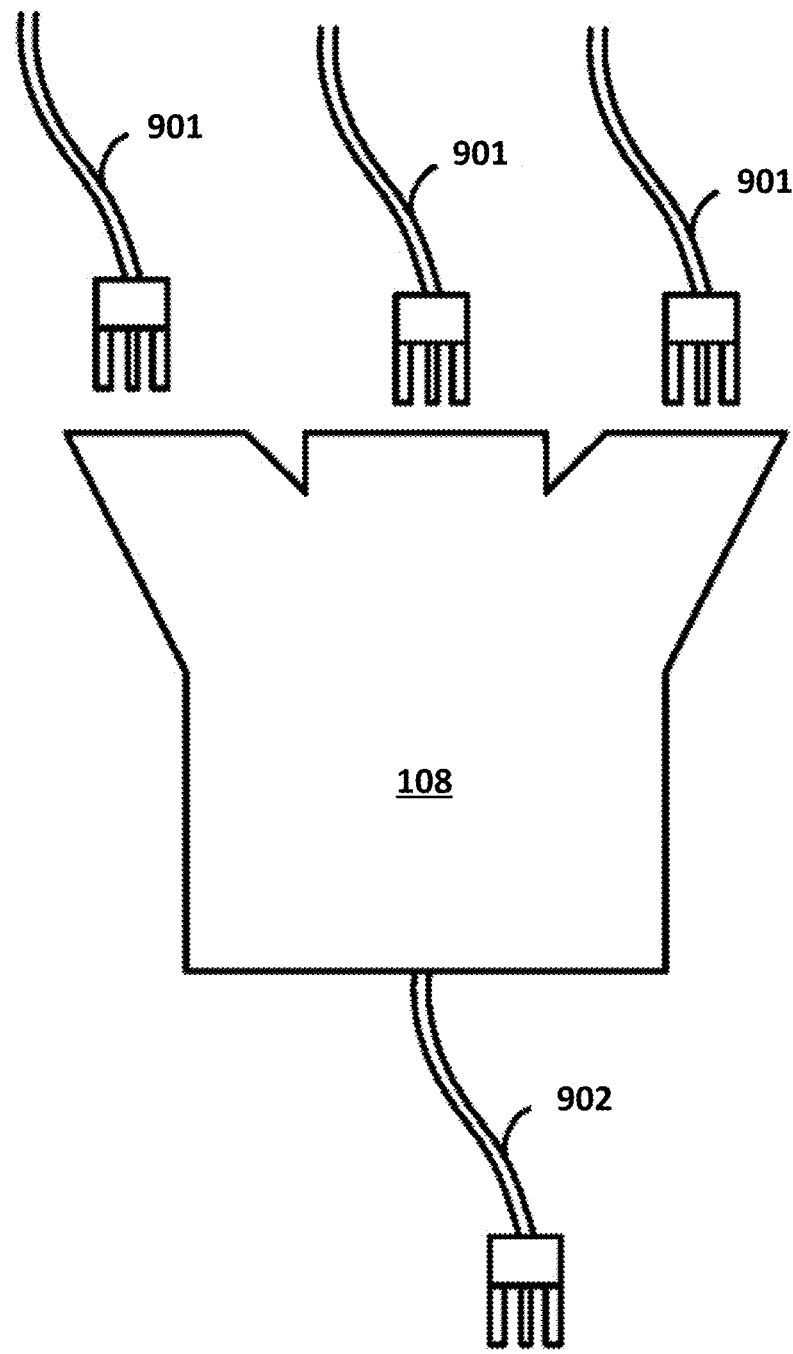
FIG. 9 illustrates an example controller as a device external to a vehicle.

FIG. 9 illustrates the controller 108 as a device external to the vehicle 106. The controller 108 can connect to the one or more components 110 and/or heating elements 114 via one or more cables 901. The cables 901 can be configured to carry one or more of data and/or power. The controller 108 can connect to a power (e.g., power supply 116) and/or a data source via a cable 902. In an aspect, the controller 108 can receive power from the power source via the cable 902 and provide power to the one or more components 110 and/or heating elements 114.

Figure 10:
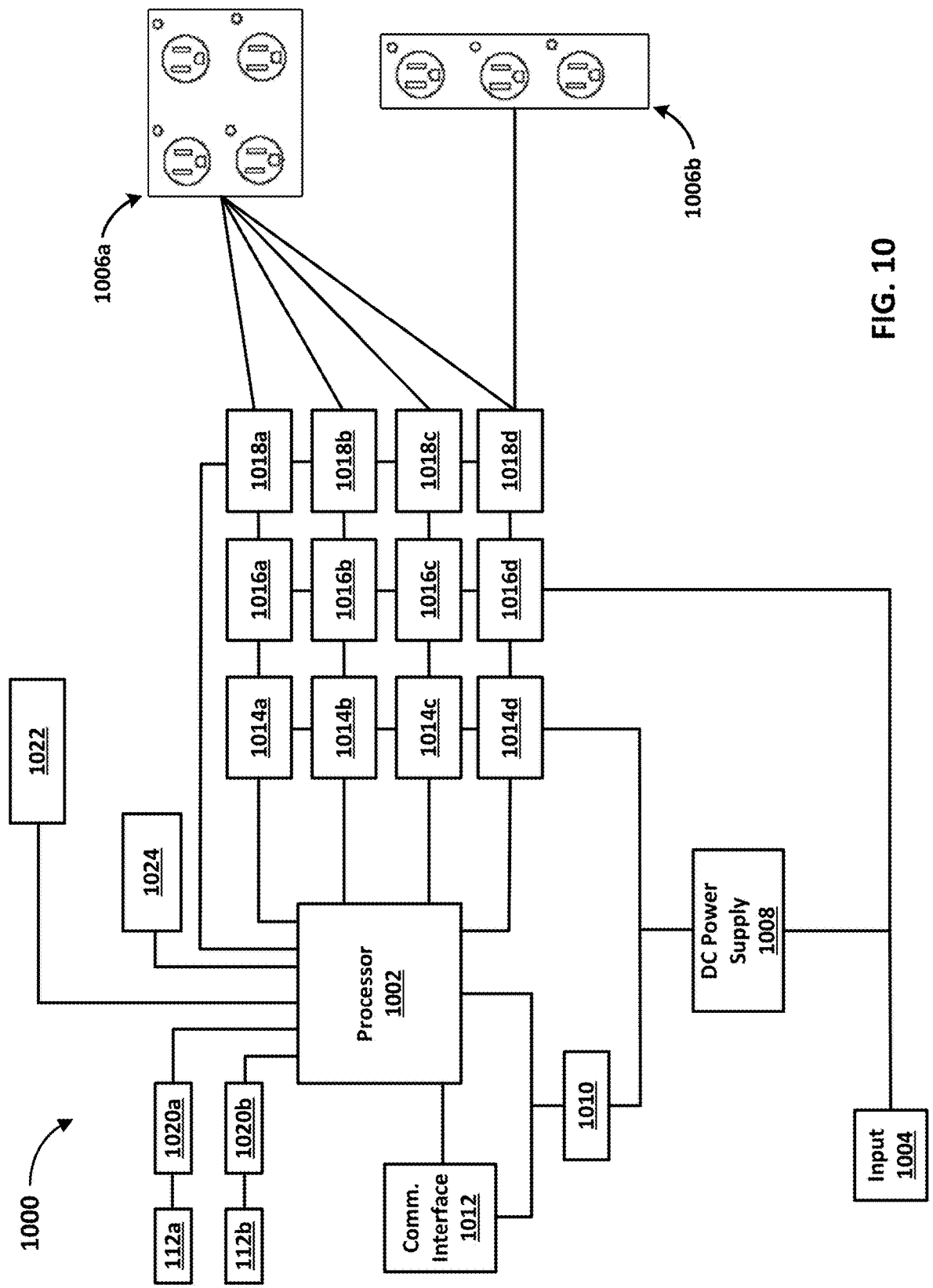
FIG. 10 is a schematic diagram illustrating an exemplary device.

FIG. 10 illustrates a schematic for an exemplary controller 1000 (e.g., the controller 108 of FIG. 1, the controller 200 of FIG. 2, the controller 300 of FIG. 3, and/or the controller 108 of FIG. 6). The controller 1000 receives power via an input 1004, which is provided to a processor 1002 (e.g., the processor 502 of FIG. 5, the processor 602 of FIG. 6, and/or the processor 703 of FIG. 7). The power input 1004 may provide any amount of power to the controller 1000 (e.g., 120 V, 240 V, etc.). The outputs 1006a and 1006b can have one or more power outlets associated with the outputs. Specifically, as shown in FIG. 10, output 1006a has four outlets, the output 1006b has three outlets. As will be appreciated by one skilled in the art, the outputs 1006a and 1006b can have any number of outlets and should not be limited the illustration shown.

The controller 1000 can be configured to provide power to the outputs 1006a and 1006b. As shown, the input 1004 provides power to a DC power supply 1008 and to relays 1016a,b,c,d. The DC power supply 1008 can provide power for the electronic portions of the controller 1000. The relays 1016 can control the power provided to the outputs 1006. Specifically, the relays 1016 can be configured to either provide power to the outputs 1006 or not provide power to the outputs 1006. The relays 1016 are controlled by relay drivers 1014a,b,c,d. Specifically, relay driver 1014a provides a control signal to the relay 1016a to provide power or not provide power to the outputs 1006. Similarly, relay driver 1014b provides a control signal to the relay 1016b, relay driver 1014c provides a control signal to the relay 1016c, and relay driver 1014d provides a control signal to the relay 1016d. The relays 1016a,b,c,d provide an input to current sensors 1018a,b,c,d that monitor the current provided to the outputs 1006. The current sensors 1018 communicate with the processor 1002. The processor 1002 can utilize signals sent from the current sensors 1018 to determine which of the outputs 1006 are being provided power and/or which outputs 1006 are drawing power.

The processor 1002 can be configured to control power provided to outputs 1006a and 1006b. The processor 1002 can be configured to provide individual control of the outputs 1006a and 1006b. For example, as shown, the output 1006a receives power from the relay drivers 1016a,b,c,d via the current sensors 1018a,b,c,d. Each relay driver 1016 can be associated with a respective outlet on the output 1006. Thus, the processor 1002 can activate and/or deactivate power provided to the outlets of the output 1006a by sending a signal to the relay drivers 1014 to activate and/or deactivate power provided by the relays 1016 to one or more of the outlets of the output 1006a. As another example, the outlets of the output 1006b can be controlled as a group. That is, the outlets of the output 1006b receive power from a single relay (e.g., the relay 1016d). Thus, the outlets of the output 1006b all receive power, or all do not receive power, depending on whether the relay 1016d is providing power to the output 1006b.

The controller 1000 can have a voltage regulator 1010 that regulates power provided to the processor 1002 and a communications interface 1012. The voltage regulator 1010 can receive power from the DC power supply, modify the power (e.g., reduce power down to 5 V), and provide the power to the processor 1002 and the communications interface 1012. The communications interface 1012 can be configured to transmit and/or receive signals (e.g., communicate) via Wi-Fi, Bluetooth, cellular, Radio Frequency (RF), as well as direct connection interfaces such as Ethernet and Universal Serial Bus (USB). The controller 1000 can receive one or more data signals sent via the communications interface 1012 from one or more external devices (e.g., the mobile device 102 and/or the server 104 of FIGS. 1, 5, and/or 6). The processor 1002 can receive instructions for controlling operation of the controller 1000.

The processor 1002 can be in communication with two sensors 112a,b. The processor 1002 can send and/or receive data signals to the sensors 112 via one or more circuit protection devices 1020a,b. For example, the circuit protection device 1020 can comprise voltage and/or current regulators that prevent the sensors 112 from providing a damaging amount of power to the processor 1002. The processor 1002 can control operation of the power outputs 1006 based on data received from the sensors 112.

The processor 1002 can be in communication with a programming interface 1022. The programming interface 1022 can be a physical interface (e.g., a port) that a device can couple to in order to provide data (e.g., instructions) to the processor 1002. For example, the programming interface 1022 can be a USB and/or Ethernet port that a device can couple to in order to provide data to the processor 1022.

The processor 1002 can be in communication with an integrated circuit 1024. The integrated circuit 1024 can indicate one or more operation points for the controller 1000. For example, the integrated circuit 1024 can have processor executable instructions that indicate what output the controller 1000 should provide on the outputs 1006. The integrated circuit 1024 can indicate the output the controller 1000 should provide based on one or more measurements by the sensors 112. As an example, the sensors 112 can provide a data signal to the processor 1002 indicating that the external temperature is 5° F. The processor 1002 can retrieve from the integrated circuit 1024 the output the controller 1000 should provide to the outputs 1006 based on the determined temperature. Thus, the integrated circuit 1024 can store one or more operation points for the controller 1000.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
receiving, by a computing device and from a user device, a temperature setting comprising a start temperature for activation of a heating element of a plurality of heating elements;
receiving, from a first sensor, an indication of an ambient temperature;
determining, based on the ambient temperature matching the start temperature, a first heating element of the plurality of heating elements to activate, wherein the first heating element is associated with a component of a vehicle;
activating the first heating element;
causing output, via a light emitting diode (LED), of light indicative of power provided to the first heating element;
receiving, from a second sensor, an indication of a temperature of the component; and
reducing, based on the temperature of the component satisfying a threshold, power provided to the first heating element.

2. The method of claim 1, wherein the component is at least one of: an oil pain, a transmission, a battery, or an engine block.

3. The method of claim 1, wherein activating the first heating element comprises providing the power to the first heating element via a power supply external to the vehicle.

4. The method of claim 1, further comprising:
determining, based on the ambient temperature, a second heating element of the plurality of heating elements; and
activating the second heating element, wherein the second heating element remains active after reducing power provided to the first heating element.

5. The method of claim 1, wherein determining the first heating element to activate is further based on at least one of a style of the vehicle, a make of the vehicle, a model of the vehicle, or a year of manufacture of the vehicle.

6. The method of claim 1, further comprising receiving, by the computing device from the user device via a wireless communication link, an instruction to activate at least one heating element of the plurality of heating elements.

7. The method of claim 1, further comprising receiving, by the computing device a from the user device via a wireless communication link, an instruction to deactivate at least one heating element of the plurality of heating elements.

8. A system, comprising:
a first sensor and a second sensor;
a user device;
a light emitting diode (LED);
a plurality of heating elements;
one or more processors; and
a memory storing processor executable instructions that, when executed by the one or more processors, cause the system to:
receive, from the user device, a temperature setting comprising a start temperature for activation of a heating element of the plurality of heating elements;
receive, from the first sensor, an indication of an ambient temperature;
determine, based on the ambient temperature matching the start temperature, a first heating element of the plurality of heating elements to activate, wherein the first heating element is associated with a component of a vehicle;
activate the first heating element;
causing output, via the LED, of light indicative of power provided to the first heating element;
receive, from the second sensor, an indication of a temperature of the component; and
reduce, based on the temperature of the component satisfying a threshold, power provided to the first heating element.

9. The system of claim 8, wherein the component is at least one of: an oil pain, a transmission, a battery, or an engine block.

10. The system of claim 8, wherein the processor executable instructions that, when executed by the one or more processors, cause the system to activate the first heating element further comprise processor executable instructions that, when executed by the one or more processors, cause the system to provide the power to the first heating element via a power supply external to the vehicle.

11. The system of claim 8, wherein the processor executable instructions that, when executed by the one or more processors, further cause the system to:
determine, based on the ambient temperature, a second heating element of the plurality of heating elements; and
activate the second heating element, wherein the second heating element remains active after the system is caused to reduce power provided to the first heating element.

12. The system of claim 8, wherein the processor executable instructions that, when executed by the one or more processors, cause the system to determine the first heating element to activate is further based on at least one of: a style of the vehicle, a make of the vehicle, a model of the vehicle, or a year of manufacture of the vehicle.

13. The system of claim 8, wherein the processor executable instructions that, when executed by the one or more processors, further cause the system to receive, from the user device via a wireless communication link, an instruction to activate at least one heating element of the plurality of heating elements.

14. The system of claim 13, wherein the processor executable instructions that, when executed by the one or more processors, further cause the system to receive, from the user device via a wireless communication link, an instruction to deactivate at least one heating element of the plurality of heating elements.

15. An apparatus, comprising:
one or more processors; and
a memory storing processor executable instructions that, when executed by the one or more processors, cause the apparatus to:
receive, from a user device, a temperature setting comprising a start temperature for activation of a heating element of the plurality of heating elements;
receive, from a first sensor, an indication of an ambient temperature;
determine, based on the ambient temperature matching the start temperature, a first heating element of a plurality of heating elements to activate, wherein the first heating element is associated with a component of a vehicle;

activate the first heating element;

causing output, via a light emitting diode (LED), of light indicative of power provided to the first heating element;

receive, from a second sensor, an indication of a temperature of the component; and reduce, based on the temperature of the component satisfying a threshold, power provided to the first heating element.

16. The apparatus of claim 15, wherein the component is at least one of an oil pain, a transmission, a battery, or an engine block.

17. The apparatus of claim 15, wherein the processor executable instructions that, when executed by the one or more processors, cause the apparatus to activate the first heating element further comprise processor executable instructions that, when executed by the one or more processors, cause the apparatus to provide the power to the first heating element via a power supply external to the vehicle.

18. The apparatus of claim 15, wherein the processor executable instructions that, when executed by the one or more processors, further cause the apparatus to:

determine, based on the ambient temperature, a second heating element of the plurality of heating elements; and activate the second heating element, wherein the second heating element remains active after deactivating the apparatus is caused to reduce power provided to the first heating element.

19. The apparatus of claim 15, wherein the processor executable instructions that, when executed by the one or more processors, cause the apparatus to determine, based on the ambient temperature, the first heating element of the plurality of heating elements to activate is further based on at least one: of a style of the vehicle, a make of the vehicle, a model of the vehicle, or a year of manufacture of the vehicle.

20. The apparatus of claim 15, wherein the processor executable instructions that, when executed by the one or more processors, further cause the apparatus to receive, from the user device via a wireless communication link, an instruction to activate at least one heating element of the plurality of heating elements.

* * * * *